United States Patent [19]

Payne, III

[11] Patent Number: 4,706,240
[45] Date of Patent: Nov. 10, 1987

[54] SWITCHING SYSTEM HAVING MULTIPLE PARALLEL SWITCHING NETWORKS

[75] Inventor: William A. Payne, III, Lombard, Ill.

[73] Assignee: American Telephone and Telegraph Co. and AT&T Bell Labs, Murray Hill, N.J.

[21] Appl. No.: 803,091

[22] Filed: Nov. 29, 1985

[51] Int. Cl.$^4$ ............................................. H04Q 11/04
[52] U.S. Cl. ........................................................ 370/60
[58] Field of Search .................... 370/60, 58, 94, 54

[56] References Cited

U.S. PATENT DOCUMENTS

| | | | |
|---|---|---|---|
| 3,573,377 | 4/1971 | Anderson et al. | 179/2 |
| 3,612,767 | 10/1971 | Anderson et al. | 179/2 TV |
| 4,314,367 | 2/1982 | Bakka et al. | 370/60 |
| 4,494,230 | 1/1985 | Turner | 370/60 |
| 4,627,048 | 12/1986 | Larson | 370/60 |

OTHER PUBLICATIONS

"4×4 Ti:LiNbO$_3$ Integrated-Optical Crossbar Switch Array", *Appl. Phys. Lett.*, 47(4), Aug. 15, 1985, pp. 348–350.

"No. 1 ESS Switching Network Frames and Circuits", *The Bell System Technical Journal*, vol. XLIII, No. 5, Part 2, pp. 2221–2253, Sep., 1964.

*Primary Examiner*—Douglas W. Olms
*Assistant Examiner*—Wellington Chin
*Attorney, Agent, or Firm*—John C. Moran

[57] ABSTRACT

A switching system having a control network for establishment of a path and a data switching network responsive to the path determined by the control network for switching data between a plurality of input ports to a plurality of output ports. The control network is a self-routing network that is fabricated utilizing electronic devices; whereas, the data switching network is fabricated using photonic devices. The electronic network is of the butterfly architecture and the photonic network is of the cross-bar architecture. A translation circuit is utilized to convert the path determined through the self-routing butterfly control network for use in determining the path through the photonic cross-bar network.

22 Claims, 8 Drawing Figures

SWITCHING SYSTEM HAVING MULTIPLE PARALLEL SWITCHING NETWORKS

TECHNICAL FIELD

This invention relates to the switching of wideband width data and more particularly, to the utilization of one switching network to control through a translation circuit the operation of a second switching network that is physically switching data.

BACKGROUND OF THE INVENTION

Present self-routing networks use the same switching fabric to implement both the control and data switching operations of the network. One such self-routing network that utilizes the same switching fabric for control and data is disclosed in U.S. Pat. No. 4,494,230, by J. S. Turner, entitled, "Fast Packet Switching System". The system disclosed in Turner utilizes address bits contained within packets to route these packets through the switching fabric.

Other prior art systems maintain a network map in the memory of a computer controlling the network. In response to a request to establish a path through the network, the controlling computer executes a program that is responsive to the stored network map to determine the required connections within the network to establish the requested path. The computer then communicates the connection information to the network which utilizes the connection information to establish the path. One well-known system that operates in this manner, is disclosed in the article by D. Danielsen, K. S. Dunlap, and H. R. Hofmann, "No. 1 ESS Switching Network Frames and Circuits," *The Bell System Technical Journal*, Vol. XLIII, No. 5, Part 2, pp. 2221–2253, September 1964. Whereas, it is known to maintain a memory map in a computer memory and to use program control to establish a path through the network, this operation requires a number of access points into the network and increases the cost and lowers the reliability of the network. In addition, the advantages of a self-routing network cannot be utilized.

Certain types of network technologies that have the capability for transmitting data at extremely high bandwidths are not well suited for performing the control operations. One such technology is the titanium diffused lithium niobate used for photonic switching. The reason why photonic switching technologies have difficulty in performing the control functions is that data path crossovers are very difficult to implement. The reason for this difficulty is that efficient waveguide crossovers require large angles of intersection in order to minimize the interface between adjacent waveguides. These large angles require that there to be large S-bends in the intersecting waveguides which are themselves lossy. Thus, efficient integrated waveguide crossovers in titanium diffused lithium niobate are very difficult to fabricate. Additional information on this problem can be found in the article by E. E. 8ergmann, et al., "Coupling of Intersecting Ti:NbO$_3$ Diffused Waveguides".

In view of the foregoing, there exists a need for a self-routing switching architecture that is capable of taking advantage of switching networks that are well-suited for performing the control functions and the use of switching networks that are capable of transmitting large bandwidths of data without being burdened with the control functions.

SUMMARY OF THE INVENTION

The foregoing problems are solved and a technical advance is achieved in accordance with the principles of this invention incorporated in an illustrated method and packet switching architecture that utilizes a control network to determine the path through a photonic data network for switching data between one of a plurality of input ports to one of a plurality of output ports. The control network is of the self-routing type and may advantageously be fabricated using electronic devices. The control network is responsive to request tokens received from an input port for automatically and efficiently determining the photonic path advantageously without involvement of a central processor. The data switching network is fabricated using photonic devices that allow the high-speed switching of the data between the requesting input port and the designated output port. Advantageously, the photonic network is of the crossbar architecture which advantageously, makes maximum utilization of the photonic switches. Advantageously, a translation circuit is utilized to convert the path information determined by the control network into control information that can be utilized by the photonic network. The input and output ports have terminations on both networks, and the electrical network is not only used to initially set up the photonic network but to also relay subsequent control information from the input ports to the networks and the output ports.

Advantageously, the control network has a number of interconnected stages comprising a plurality of switch nodes. Within a stage, a switch node has a first set of input and output terminals connected to a node in the preceding stage and to a node in the subsequent stage, respectively; and a second set of input and output terminals interconnected to a preceding node and a subsequent node, respectively, in the same stage. When a request circuit interconnected between the first set of terminals determines that a request token received from the input terminal of the first set is designated for that node and a contention resolution circuit interconnected between the second set of terminals determines that a contention resolution token received from the input terminal of the second set is in the idle state, a node state circuit transmits a path signal to the translation circuit in response to the two determinations. The translation circuits converts the path signal for use by the photonic data network, and the latter network sets up an internal path therethrough in response to the converted or translated signal to interconnect an input port to an output.

Advantageously, both types of tokens have an address field and control field that defines the function of the token. After the path signal is transmitted by node state circuit, the request circuit modifies the control field of the request token to indicate a grant function and communicates the modified token to another output port. In response to the modified token, the latter output port signals the requesting input port that the path has been established. Similarly, the contention circuit modifies the contention resolution token to indicate a path busy function and communicates the modified contention resolution token to the designated output port to indicate that a path has been set up through the photonic data switching network.

In addition, the path through the photonic data switching network is removed by associated input port transmitting a token to the control network whose control field indicates a path tear down function. The state circuit removes the path through the photonic data switching network upon the latter token being received by the request circuit and an idle contention resolution token being received by the contention circuit.

Also, the request circuit updates the latter token's control field to indicate a path clear function and communicates this updated token to the other output port which signals the associated input port that the path has been removed. Similarly, the contention resolution token is updated and communicated to the designated output port to indicate that the path has been removed.

In addition, the photonic data switching array is arranged as groups of photonic devices with each group capable of switching one input port to any of the output ports. One photonic device is responsive to the translated path signal to interconnect one input port to one output port.

The method for controlling a data switching system for communicating data between a plurality of input and output ports having a first and second switching network with the first network controlling the second network via a translation circuit, executes the steps of establishing a path in the first switching network by the latter network responding to a request from an input port, generating path setup signals by the first network suitable for controlling the first network, translating the path setup signals to signals suitable for controlling the second network's architecture, and setting up a path through the second network between the requesting input port and the designated output port by the latter network responding to the translated path setup signals.

DETAILED DESCRIPTION

Figure 1:
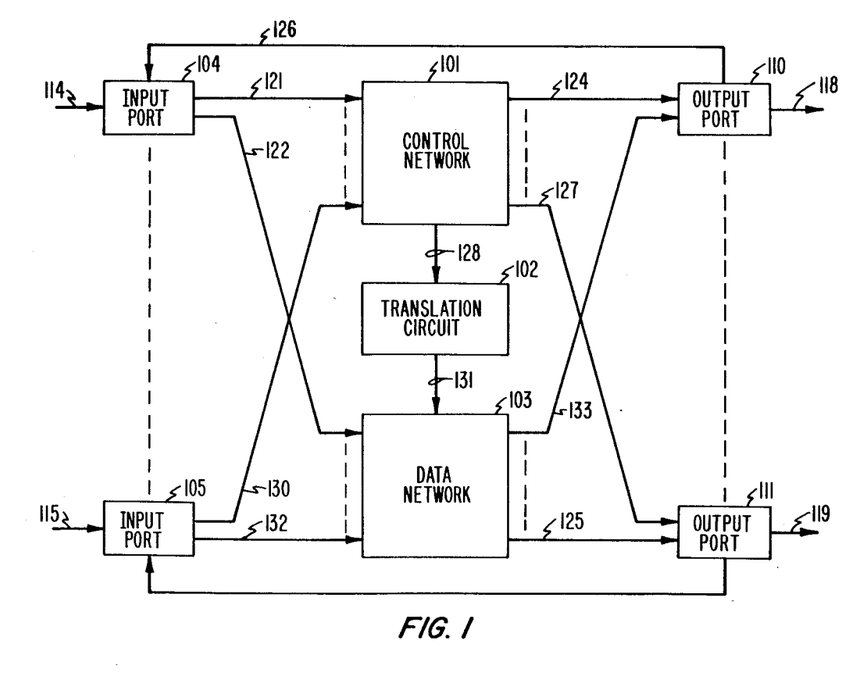
FIG. 1 illustrates a switching system which is the subject of the present invention.

Illustrated in FIG. 1 is a switching system that utilizes control network 101 to determine the communication path through data network 103 via cable 128, translation circuit 102, and cable 131. The switching system illustrated in FIG. 1 is responsive to information received via optical links 114 through 115 to switch this information to optical links 118 through 119.

For example, when input port 104 receives information via optical link 114, that is to be communicated to optical link 119, input port 104 first transmits via conductor 121, a request token to control network 101 to determine a path through data network 103 from input port 104 to output port 111 via optical links 122 and optical link 125. Control network 101 is responsive to the request token received via conductor 121 to route this request token through control network 101 in order to set up a path through the latter network. Once the path has been established through control network 101, the latter network transmits the request token to output port 110, via cable 124 indicating the establishment of a path and data network path information to translation circuit 102 via cable 128. In response to this path information, the latter circuit transmits control information via cable 131 to establish a path through data network 103. In addition, a contention resolution token indicating the commencement of the transfer of data via cable 127 is transmitted to output port 111.

Output port 110 is responsive to the request token received via cable 124 to transmit an acknowledgement signal via conductor 126 to input port 104. The acknowledgement signal indicates to input port 104 that a path has been established through data network 103. Output port 111 is responsive to the contention resolution token received via cable 127 to initiate the proper circuit to receive information via optical link 125. Translation circuit 102 is responsive to the data network path information received via cable 128 to generate control information and transmit the latter information to data network 103 via cable 131. Data network 103 is responsive to the control information received via cable 131 to establish a path from optical link 122 to optical link 125.

It would be obvious to one skilled in the art that the function performed by the transmission of the request token from control network 101 to output port 110 and the acknowledgement signal transmitted from output port 110 via conductor 126 to input port 104 to signal that a path had been established could be performed by output port 111 transmitting an acknowledge signal in the reverse direction via cable 127 back through the path established through control network 101 via conductor 121 to input 104. The signal transmitted over such a path from output port 111 to input port 104 would be used to indicate the existence of a path to input port 104.

Figure 2:
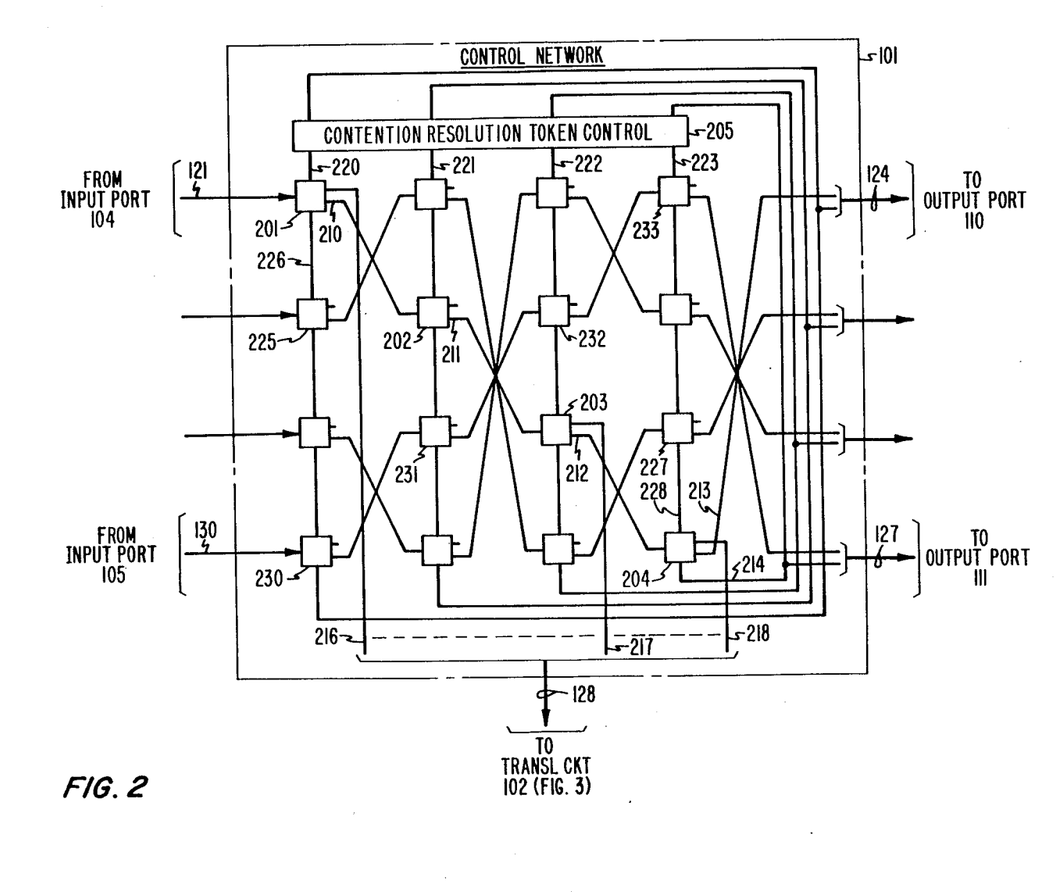
FIGS. 2 and 3 illustrate in greater detail, the switching system illustrated in FIG. 1.
Figure 3:
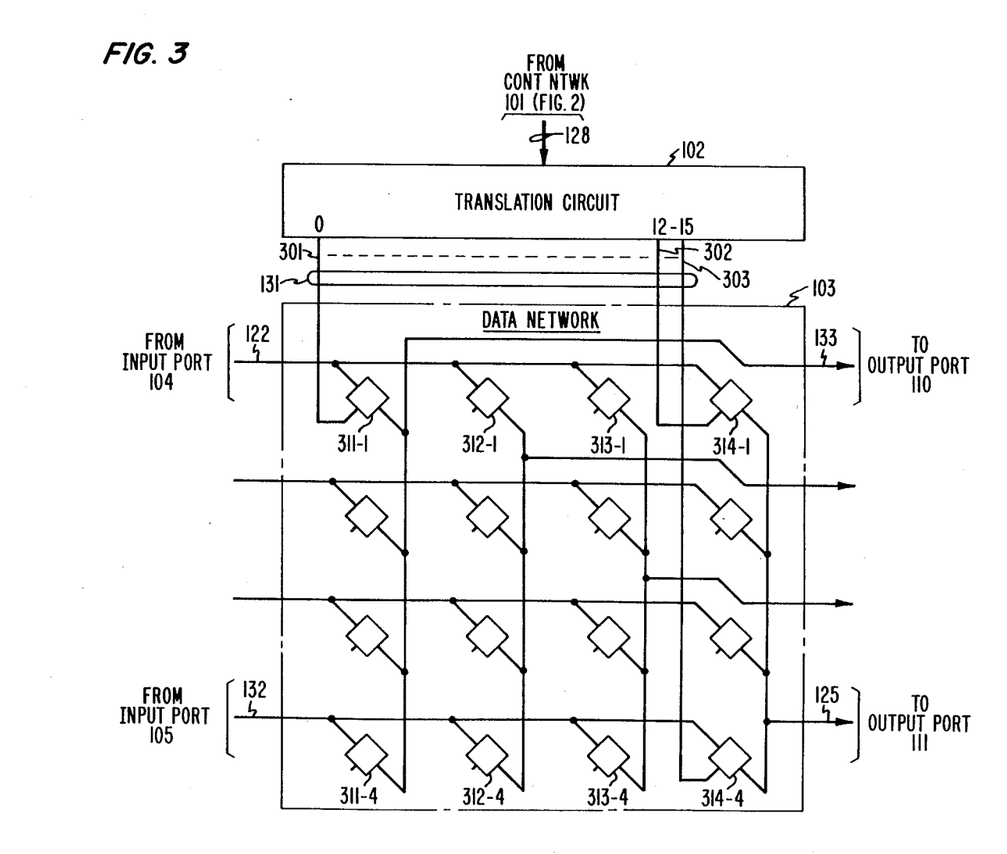
Figure 4:
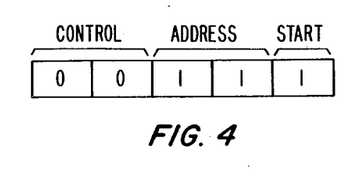
FIG. 4 illustrates the request token used by the switching system of FIGS. 2 and 3.

FIGS. 2 and 3 illustrate in detail, the switching system of FIG. 1. As is explained in greater detail, with respect to FIG. 6, when an input port such as 104 receives a packet on optical link 114 requiring a path be set up through data network 103, input port 104 transmits a request token as illustrated in FIG. 4 to control network 101 via 121. The address of the request token designates which stage of the control network is to handle the request. When the request token reaches that stage and is recognized by the receiving node, the receiving node then awaits the arrival of a contention resolution token from contention resolution token control 205 with the control field set equal to idle. The receiving node then sets the contention resolution token's control field equal to busy and transfers the contention resolution token to the next node. Eventually, contention resolution token is returned to the contention resolution token control and also transmitted to a designated output port such as port 111. In addition, the receiving node transmits a signal via a cable such as cable 128 to translation circuit 102 to set up data network 103 and transmits the received request token with the control field set equal to grant to an output port such as output port 110. In addition, the contention resolution token is transferred to the output port that is to receive the optical data from data network 103.

Contention resolution token control 205 periodically transmits via each of the conductors 220 through 223, a contention resolution token to the nodes interconnected as a vertical column to the respective conductor 220 through 223. If a node has received a packet such as illustrated in FIG. 4 with the address bits equal to zero, the node upon receipt of the contention resolution token illustrated in FIG. 5 changes the idle/busy bit equal to busy before transferring it to the next node in the vertical column. For example, node 201 transfers the contention resolution token received via conductor 220 to node 225 via conductor 226.

In the previous example, input port 104 transmits the request token illustrated in FIG. 4 via conductor 121 to node 201. In response to the request token illustrated in FIG. 4, node 201 decrements the address field and transfers the resulting request token to node 202 via conductor 210. The latter node, in response to the request token, once again decrements the address field by one and transfers the resulting request token to node 203 via conductor 211. Node 203 is responsive to the request token to decrement the remaining number in the address field to zero and to transfer the resulting request token to node 204.

In response to the received request token from node 203 with the address field equal to a zero, node 204 awaits the arrival of a contention resolution token from node 227 via conductor 228 with the control field indicating idle. Upon receiving an idle contention resolution token, node 204 changes the control field from idle to busy and retransmits the contention resolution token via conductor 214 to output port 111. In addition, node 204 modifies the request token's control field to grant and transmits it via conductor 213 which is part of cable 124 to output port 110. Output port 110 is responsive to the modified request token to transmit an acknowledge signal to input port 104 via conductor 126. Also, node 204 transmits a connect or transfer signal to translation circuit 102 via conductor 218. Translation circuit 102 is responsive to the connection signal to enable a path through data network 103 from optical link 122 to optical link 125. If the contention resolution token received by node 204 was busy, node 204 only retransmits this contention resolution token via conductor 214 to output port 111. Output port 111 is responsive to the receipt of the contention resolution token indicating the busy state to perform operations in preparation for receipt of data via optical link 125 if data is not already being received.

One skilled in the art could observe from control network 101, as illustrated in FIG. 2, that the input ports 104 through 105 each have equal priority in setting up paths through data network 103 by virtue of the manner in which the request token is passed between the nodes illustrated in FIG. 2. For example, whereas input port 104 has the highest priority with respect to receipt of the contention resolution token transmitted via conductor 220 from contention resolution token control 205, input port 105 has the highest priority with respect to the contention resolution token transmitted by contention resolution token control 205 via conductor 223. Careful observation by one skilled in the art would reveal that priority is equally distributed with respect to the other input ports and the conductors communicating the contention resolution tokens from contention resolution token control 205.

Data network 103 is illustrated in greater detail in FIG. 3. The switch nodes illustrated in FIG. 3, such as switch node 314-4, are fabricated using titanium diffused lithium niobate technology. The manner of designing and fabricating such a node using this technology is described, for example, in the article by R. C. Alferness and R. V. Schmidt, "Directional Coupler Switches, Modulators and Filters Using Alternating $\Delta\beta$ Techniques," *IEEE Transactions on Circuits and Systems*, Vol. CAS-26, No. 12, Dec., 1979; U.S. Pat. No. 4,284,663 by J. R. Carruthers, et al.; and U.S. Pat. No. 4,439,265 by R. C. Alferness, et al.

Translation circuit 102 is responsive to the signal transmitted from node 204 of control network 101 via conductor 218 to generate a signal transmitted via conductor 302 to node 314-1. In response to the signal communicated via conductor 302, node 314-1 interconnects optical link 122 to optical link 125. The translation performed by translation circuit 102 is given by the following formula.

$$D_i^{(1)} = i \text{ for } c = 1$$

$$D_i^c = \frac{(2k-1)n}{2^{j-i}} - D_i^{(c-1)} + 1 \text{ for } c > 1$$

i = inlet port number
n = number of stages
c = stage number
j = interlink number $$k = \left| \frac{D_i^{(c-1)} \times 2^{j-1}}{n} \right|$$

k is always rounded upward to an integer value,
$D_i^c$ = the node in control network 101 exerting control over the node in data network 103 in stage c in position i, of that stage. The inlet port number, i, is assigned as 1 through 4 for optical links 122 through 132 of FIG. 3. The number of stages is 4 for the data network 103. The stage number, c, corresponds to 1 through 4 for the stages comprising nodes 311-1 through 311-4, nodes 312-1 through 312-4, nodes 313-1 through 313-4, and nodes 314-1 through 314-4, respectively. The interlink number, j, is equal to 2 between stages 1 and 2 and between stages 3 and 4 and is equal to 1 between stages 2 and 3. The nodes of FIG. 2 are grouped into corresponding stages with node 201 being part of stage 1, node 202 being part of stage 2, node 203 being part of stage 3, and node 204 being part of stage 4. Node 201 is designated by $D_i^1 = 1$, whereas node 230 is designated by $D_i^1 = 4$ since the stage number, c, equals 1 in both cases.

Consider the example of determining the node that controls node 312-1 of FIG. 3. Inserting values into the above equations results in the following:

$$D_1^2 = \frac{(2k-1)4}{2^{2-1}} - D_1^{(2-1)} + 1$$

where:

$D_1^{(2-1)} = D_1^1 = 1$ $$k = \left| \frac{D_1^1 \times 2^{2-1}}{4} \right| = \left| \frac{2}{4} \right| = 1$$

$$D_1^2 = \frac{(2 \times 1 - 1)4}{2} - 1 + 1 = 2$$

Where $D_1^2 = 2$ designates node 202 of FIG. 2 as the node controlling node 312-1.

The path through data network 103 from optical link 122 to optical link 125 is removed in the following manner. Input port 104 transmits a token identical to that illustrated in FIG. 4 with the exception that the control field contains "10" indicating a tear down path function. Nodes 201, 202, and 203 are responsive to this new token received via conductor 121 to process it in the same manner as previously described with respect to the request token illustrated in FIG. 4. Upon receipt of this new request token on conductor 212 and a contention resolution token in the idle state via conductor 228, node 204 ceases to transmit the connect signal via connector 218. In addition, node 204 transmits the request token with the control bits set equal to "11" indicating path is being removed to output port 110 via conductor 213. Output port 110 is responsive to this token to relay an acknowledge signal back to input port 104 thus indicating to input port 104 that the disconnect operation has taken place. In addition, node 204 changes the control field of the contention resolution token to "11" to output port 111 to indicate that the path has been cleared.

Figure 6:
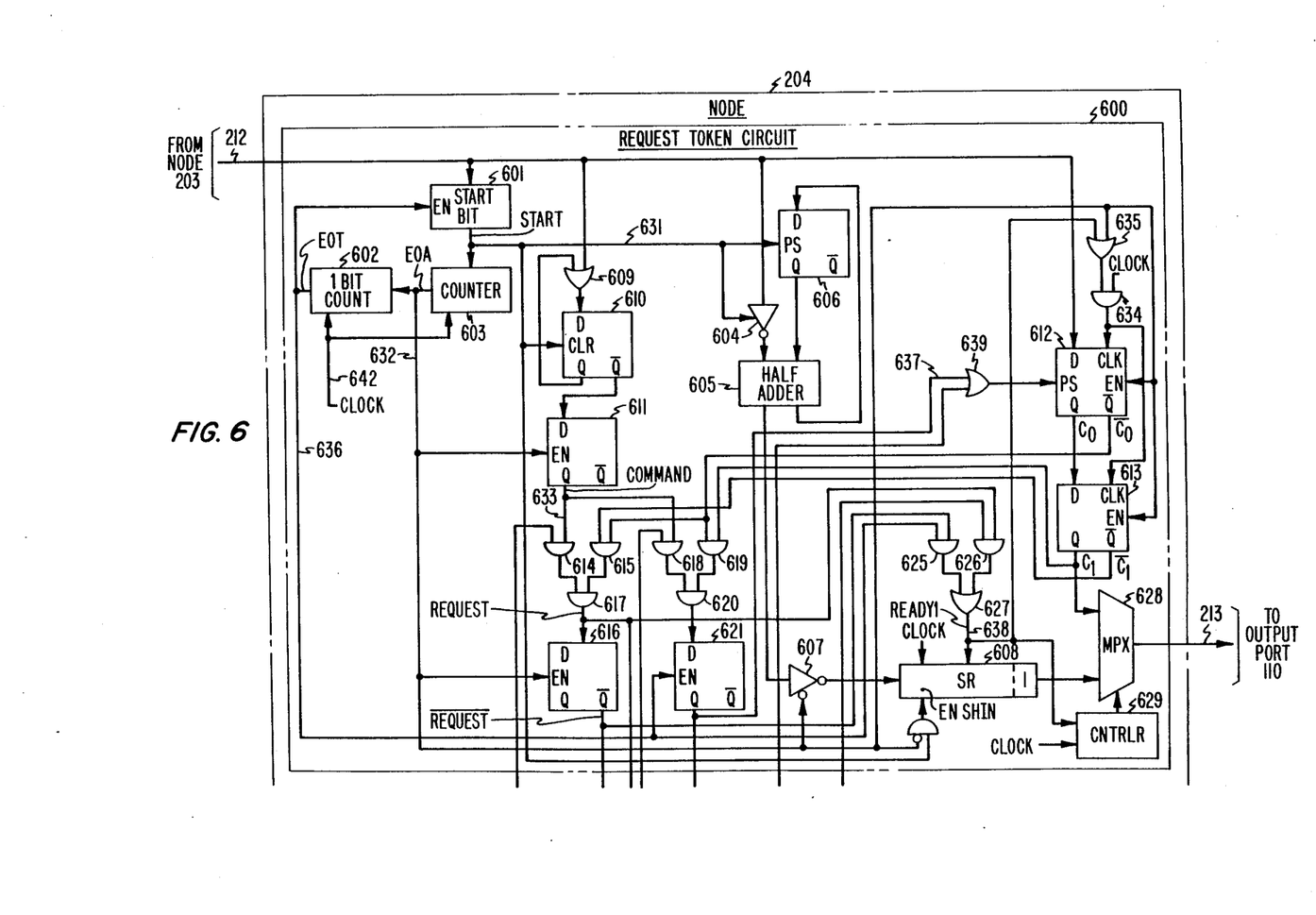
FIGS. 6 and 7 illustrate in detail, node 204 of FIG. 2.
Figure 7:
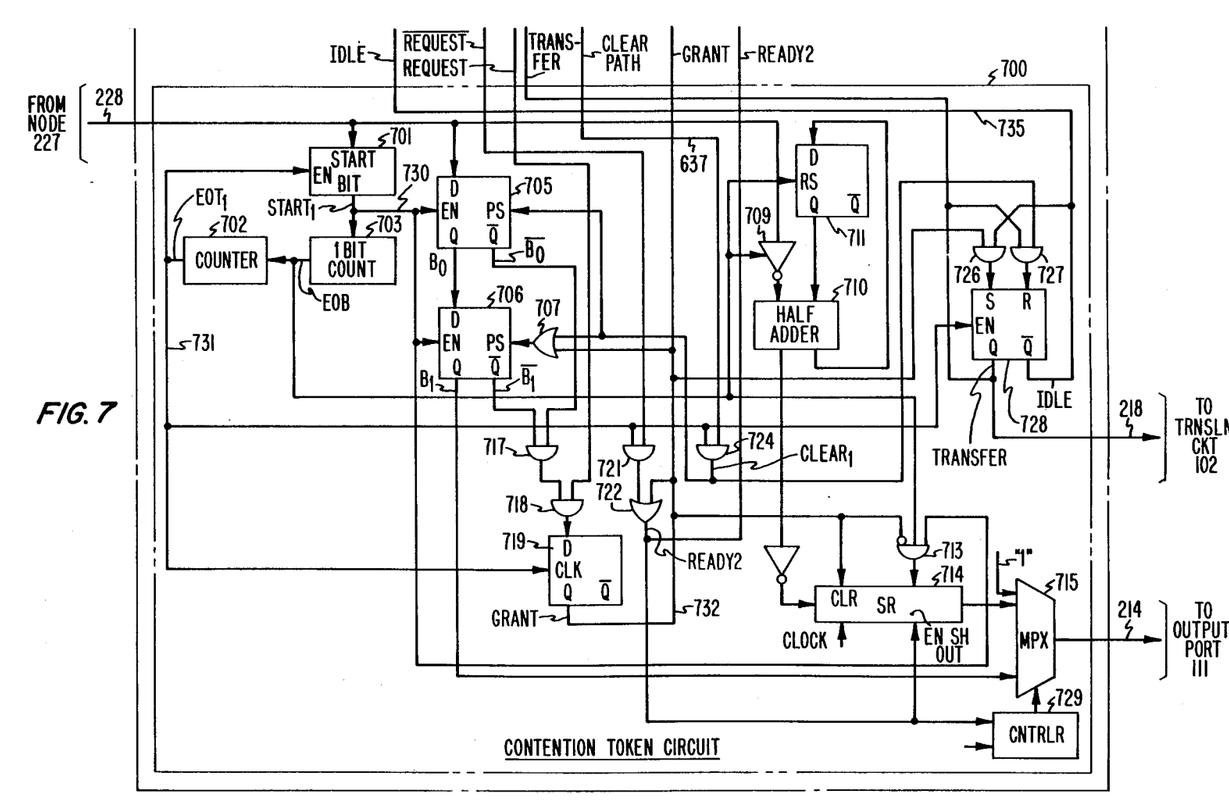
Figure 8:
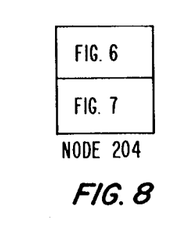
FIG. 8 illustrates how FIGS. 6 and 7 may be combined.

Node 204 is illustrated in greater detail in FIGS. 6 and 7. FIG. 6 illustrates the request token circuit 600 which handles the request received via conductor 212 and retransmitted via conductor 213. Contention token circuit 700 is illustrated in FIG. 7 that circuit handles the contention resolution token received via conductor 228 and retransmitted via conductor 214. Request circuit 600 is responsive to a request token, such as illustrated in FIG. 4, to perform the functions designated by the control field of the request token. These functions are given in Table I below.

TABLE I

| $C_1C_0$ | FUNCTION |
|---|---|
| 00 | REQUEST |
| 01 | GRANT |
| 10 | TEAR DOWN |
| 11 | PATH CLEAR |

The start of the request token is detected by flip-flop 601 detecting the start bit of the token and transmitting the start signal via conductor 631. In response to the latter signal, elements 604, 605, and 606 decrement the address bits of the token by one and transfer these decremented address bits to shift register 608 via gate 607. In addition, the start signal enables counter 603 to commence decrementing in order to determine the end of the address field. Upon the occurrence of the end of the address field, counter 603 transmits the EOA signal via conductor 632 indicating the end of the address field. Also responsive to the generation of the start signal is flip-flop 610 which, in conjunction with gate 609 and flip-flop 611, detects whether or not a zero is present in the address field. The presence of a zero would indicate that the request token is destined for node 204. Once all the address bits have been received via conductor 212, flip-flop 611 is responsive to the EOA signal transmitted via conductor 632 to generate the command signal transmitted via conductor 633 if the address field contained a "0". Further, gates 635 and 634 are responsive to the EOA signal and the clock signal to clock the control bits of the request token into flip-flops 612 and 613.

Counter 602 is responsive to the EOA signal and the clock signals received via path 642 to determine the end of the control field and to generate the EOT signal upon the end of the control field occurring which is transmitted via conductor 636. In response to the EOT signal, the control bits of the request token are decoded. The control bits can indicate either a request or a tear down path function. The functions of grant and path cleared, as illustrated in Table I, are used by the request token circuit 600 to indicate to output port 110 what actions have been taken.

If the command is a request and an idle contention resolution packet has been received via conductor 228, gates 614, 615, and 617 decode that the request packet indicates a request function which was designated for node 204 and that a contention resolution token was received with its control bits set equal to idle. The receipt of an idle contention resolution token is indicated by the presence of the idle signal received via conductor 735 from contention token circuit 700. If a request function is detected, this fact is clocked into flip-flop 616 by the EOA signal transmitted via conductor 632. If the node is in the transfer state, and the request token is received indicating a tear down path function, then elements 618 through 621 are responsive to the control bits, the transfer signal, command signal, and EOT signal to generate the clear path signal on conductor 637 from flip-flop 621.

After the decoding of the control portion of the request token has been performed, the token is transmitted out on conductor 213. If a request function was not detected in the control field of the request token, then AND gate 625, in response to the fact that no request has occurred and the EOT signal causes OR gate 627 to transmit the READY1 signal via conductor 638. If a tear down path function had been received in the control field, the clear path signal transmitted via conductor 637 to OR gate 639 presets flip-flop 612 resulting in the control field containing "11" which indicates the path cleared function. Controller 629 is responsive to the READY1 signal and the clock signal to condition multiplexer 628 to receive the output of shift register 608. The latter shift register is responsive to the READY1 signal to transfer its output to multiplexer 628. The first bit of shift register 608 is preset to a one to signify the start bit. After controller 629 has determined that the start bit and address fields have been shifted out through multiplexer 628, it conditions multiplexer 628 to accept the output of flip-flop 613. Flip-flops 612 and 613 are responsive to the output AND gate 634 to transfer the control field to multiplexer 628. AND gate 634 is responsive to the clock signal and the READY1 signal which is an input to OR gate 635. After the control field has been multiplexed out, controller 629 resets request token circuit 600 in a standard way in preparation for receipt of the next request token.

If a request function was received and a contention resolution token indicating the idle state resulting in the grant signal from flip-flop 719 being generated, then the READY1 signal is generated by OR gate 627 and transmitted via conductor 638. The grant signal also presets flip-flop 612 via OR gate 639. The information in shift register 608 and flip-flops 612 and 613 are shifted out through multiplexer 628 under control of controller 629.

Figure 5:
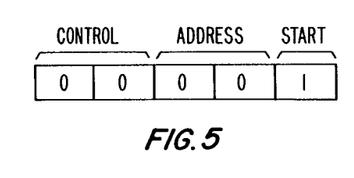
FIG. 5 illustrates the contention resolution token used by the switching system of FIGS. 2 and 3.

Contention token circuit 700 is illustrated in greater detail in FIG. 7. The latter circuit is responsive to the contention resolution token received on conductor 228 and as illustrated in FIG. 5. The address field is not used to determine the destination node but rather to designate to the receiving output port which node seized the contention resolution token. Flip-flop 701 is responsive to the start bit to transmit the start signal via conductor 730. The start signal enables the transfer of the control field into flip-flops 705 and 706. After the control field has been clocked into the latter flip-flops, counter 703 generates the EOB signal which enables the transfer of the address bits via elements 709 and 710 into shift register 714. Before the address field is transferred into shift register 714, it is decremented by one by elements 710 and 711. Once the address field has been completely received, counter 702 generates the $EOT_1$ signal on conductor 731. If a request is pending from request token circuit 600, as indicated by the request signal being transmitted from the output of flip-flop 616 and the control field of the contention resolution token just received equals "00", flip-flop 719 is set via gates 717 and 718 indicating that a path has been granted in data network 103. This fact is indicated by the transmission of the grant signal via conductor 732 from the output of flip-flop 719. This results in flip-flop 728 being set to the transfer state and transmitting the transfer signal on conductor 218 to set up the path through the data network 103.

If the grant signal is generated, then flip-flop 706 is preset before the contention resolution token is shifted out on conductor 214. The setting of the latter flip-flop changes the control bits from idle to busy. The functions defined by the control bits are illustrated in Table II.

TABLE II

| $B_1B_0$ | FUNCTION |
|---|---|
| 00 | IDLE |
| 10 | BUSY |
| 11 | CLEAR PATH |

When the grant signal is generated, OR gate 722 generates the READY2 signal which enables controller 729 to control multiplexer 715 to select first a steady stage "1", then flip-flops 705 and 706 and finally shift register 714 for transmission of the contention resolution token on conductor 214.

If a request was not pending from the request token circuit 600 when the contention resolution token was received, gates 721 and 722 immediately generate the READY2 signal after the $EOT_1$ signal is generated by counter 702. Again, the information in flip-flops 705 and 706 and shift register 714 is transmitted out via multiplexer 715 and conductor 214.

If request token circuit 600 is indicating a clear path command, then AND gate 724 generates the $CLEAR_1$ signal in response to the clear path signal and $EOT_1$ signal. The clear path signal resets flip-flop 728 via AND gate 727 to IDLE before the contention resolution token is shifted out. The resetting of flip-flop 728 ceases the transmission of the transfer signal to translation circuit 102 thus removing the path through data network 103.

It is to be understood that the above-described embodiment is merely illustrative of the principles of the invention and that other arrangements may be devised by those skilled in the art without departing from the spirit and scope of the invention.

What is claimed is:

1. A switching system for communicating data from a plurality of input ports to a plurality of output ports, comprising
   a first switching network of a self-routing type responsive to a path request from one of said input ports for establishing the requested path through said first switching network;
   second switching network of a type other than self-routing for communicating the data from said plurality of input ports to said plurality of output ports;
   said first switching network comprising means responsive to said path being set up through said first switching network for generating signals to control said second switching network;
   means for translating the generated signals to convert the path through said first network for use in controlling said second switching network;
   said second switching network responsive to the translated signals for establishing a path for the communication of data from said one of said input ports to one of said output ports; and
   said first switching network further comprises means for indicating that a data path has been set up through said second switching network to said one of said output ports.

2. The switching system of claim 1 wherein said first switching network further comprises means for alerting said one of said input ports upon the requested path having been established.

3. The switching system of claim 2 wherein said first switching network is fabricated using one type of physical technology; and
   said second switching network is fabricated using another type of physical technology.

4. The switching system of claim 1 wherein said first switching network comprises a plurality of stages;
   said path request comprises a token having address signals designating one of said stages and control signals indicating a request function;
   means for transmitting another token for resolving contention within said designated stage to said designated stage; and
   said designated stage comprises means responsive to said token and said other token for generating said other signals.

5. The system of claim 4 wherein said designated stage further comprises means responsive to said token and said other token for modifying said control signals of said token; and
   means for communicating the modified token to said one of said input ports to indicate path set up.

6. The system of claim 5 wherein said designated stage further comprises means responsive to said token and said other token for modifying the control signals of said other token to indicate a path having been set up and to communicate the modified packet to said one of said output ports.

7. The switching system of claim 6 wherein said second switching network comprises a plurality of groups of switching nodes with each of said groups interconnecting one of said input ports to a individual one of said output ports; and
   said translation means responsive to a set of said generated signals for generating a path signal to control one of said switching nodes.

8. The switching system of claim 7 wherein said switching nodes comprise titanium diffused lithium niobate devices for photonically switching said data.

9. A switching system for communicating data from a plurality of input ports to a plurality of output ports, comprising a first switching network comprising a plurality of stages with each stage having a plurality of switch nodes;

one of said switch nodes comprises a set of input and output terminals with the input terminal of said set interconnected to an individual switch node of the preceding stage and said output terminal of said set interconnected to an individual switch node of the subsequent stage;

another set of input and output terminals with the input terminal of said other set connected to a preceding switch node of the same stage as said one of said switch nodes and said output terminal of said other set interconnected to the subsequent switch node of the same stage;

means interconnected to said input and output terminals of said set responsive to a token indicating a request function from one of said input ports for determining that said token is designated for said one of switch nodes;

means interconnected to said other set of input and output terminals responsive to another token received from the preceding switch node of said same stage for indicating path availability upon said other token being in the idle state;

means responsive to receipt of the determined token and said other token indicating an idle function for generating a path signal to determine a path;

second switching network for communicating the data from said plurality of input ports to said plurality of output ports;

means for translating the generated path signal to convert said path through said first network for use to control said second switching network; and said second switching network responsive to the translated path signal for establishing a path for the communication of data from said one of said input ports to one of said output ports.

10. The system of claim 9 wherein said token comprises address signals and control signals for indicating the state of said token and said determining means comprises means responsive to said token for modifying said control signals to indicate a grant function; and means for communicating said modified token to another output port that signals said one of said input ports.

11. The system of claim 9 wherein said determining means further comprises means responsive to a second token received via said input terminal of said set whose control signals indicate a path tear down function of the determined path for ceasing to generate said path signal upon the receipt of a third token received via said input terminal of said other set indicating an idle state.

12. The system of claim 11 wherein said ceasing means comprises means for updating said control signals of said second token to indicate a path clear function; and said communicating means further responsive to the updated second token to communicate the latter token to said other output port that signals said one of said input ports to inform said one of said input ports that said path has been removed.

13. The system of claim 11 wherein said other token comprises address signals and control signals and said indicating means comprises means for modifying said control signals of said other token to indicate a path busy function;

means for transmitting the modified other token to said one of said output ports thereby indicating that said path has been established.

14. The system of claim 13 wherein said indicating means further comprises means responsive to the receipt of said second token whose control signals indicate a clear path function to modify said third token whose control signals indicate an idle function so that said modified control signals indicate a clear path function; and said transmitting means further responsive to the modified third token for transmitting the latter token to said one of said output ports thereby indicating that the path has been removed.

15. The system of claim 14 wherein said second switching network comprises a plurality of groups of switch nodes with each of said groups capable of interconnecting one of said input ports to any of said output ports; and said translation means further responsive to said generated path signal for transmitting said translated path signal to one of said switch nodes of said second switching network thereby interconnecting said one of input ports to said one of said output ports.

16. The switching system of claim 15 wherein said switching nodes comprise titanium diffused lithium niobate devices for photonically switching said data.

17. The system of claim 14 wherein the switch nodes of each stage of said switch network are interconnected such that each of the input ports in comparison to each other have equal priority of being able to establish a path through said other switching network to all of said output ports.

18. A method for controlling a data switching system for communicating data between a plurality of input ports and a plurality of output ports having a first and second switching network with said first network having the capability of transmitting path set up signals that define a path through said first network to said second switching network via a translation circuit, comprising the steps of:

interrogating in response to a path request comprising address signals defining a path through said first network from one of said input ports said address signals to determine said path through said first network;

fixing said path through said first network in response to the interrogated address signals;

generating said path set up signals to control said second switching network by said first switching network by converting the path through said first network for use by said second network in response to said path being set up through said first network;

translating the path set up signals for communication to said second switching network by said translation circuit;

setting up a path through said second switching network in response to the translated signals for the communication of data from said one of said input ports to one of said output ports; and indicating that a data path has been set up through said second network to said one of said output ports by said first network.

19. The method of claim 18 further comprises the steps of alerting said one of said input ports upon the requested path having been established through said first network.

20. The method of claim 19 wherein said first network comprises a plurality of stages each having a plurality of switch nodes and said path request comprises a token having address signals designating one of said stages and control signals indicating a request function and a resolution control circuit for transmission of resolution control tokens for determining which switch node in a particular stage has priority, and said step of establishing comprises the steps of:

transmitting one of said contention resolution tokens within the stage designated by said address signals of said token; and generating said path setup signals by one of said switch nodes within said designated stage in response to said token and said one of said contention resolution tokens.

21. The method of claim 20 wherein said alerting step further comprises the steps of:

modifying the control signals of said token; and communicating the modified token to another output port that signals said one of said input ports to indicate path set up.

22. The method of claim 21 wherein said contention resolution token comprises contention control signals and said step of indicating comprises the steps of:

modifying said contention control signals to indicate a path having been set up; and communicating the modified contention resolution packet to said one of said output ports.

* * * * *